United States Patent Office 3,452,543
Patented July 1, 1969

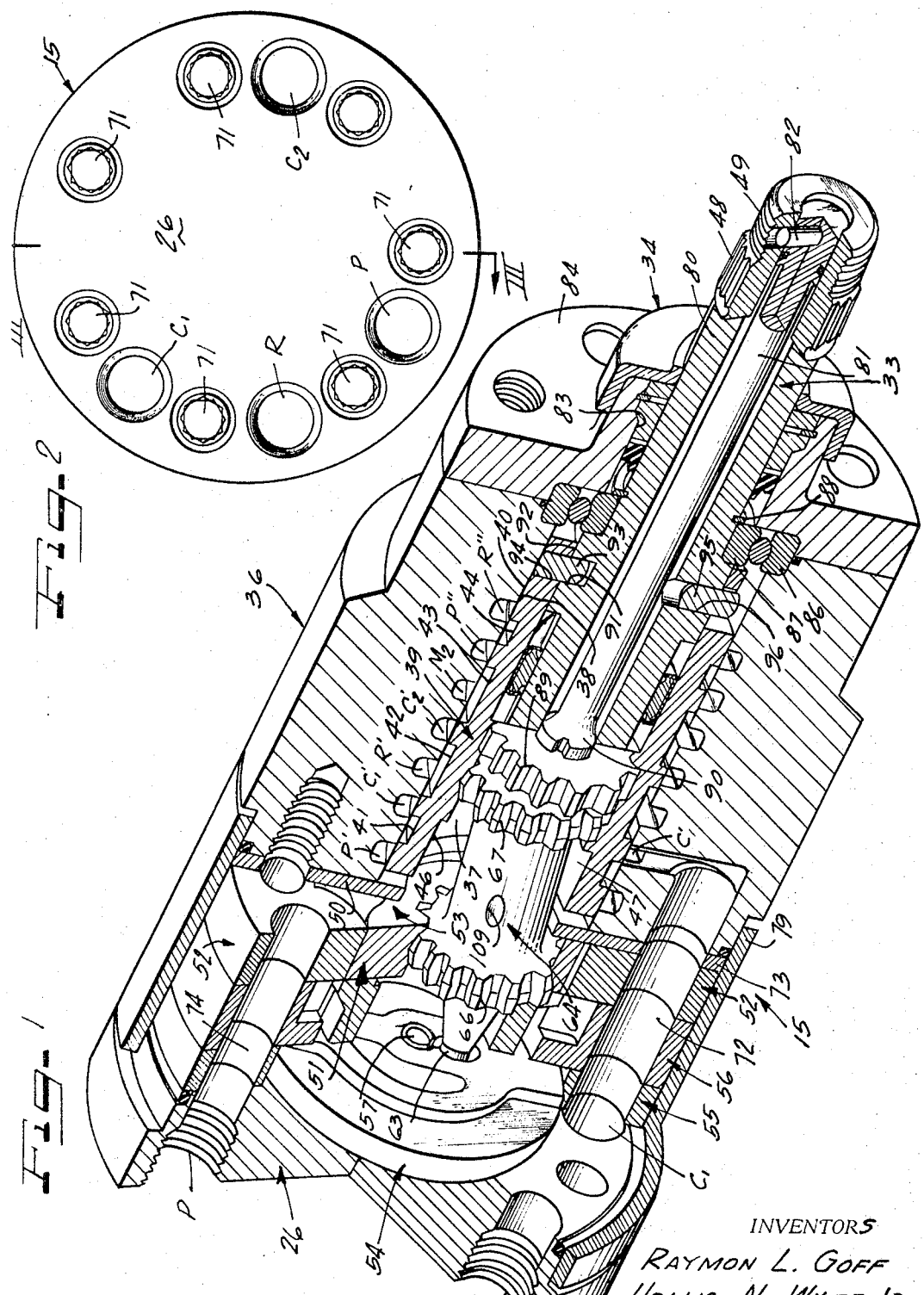

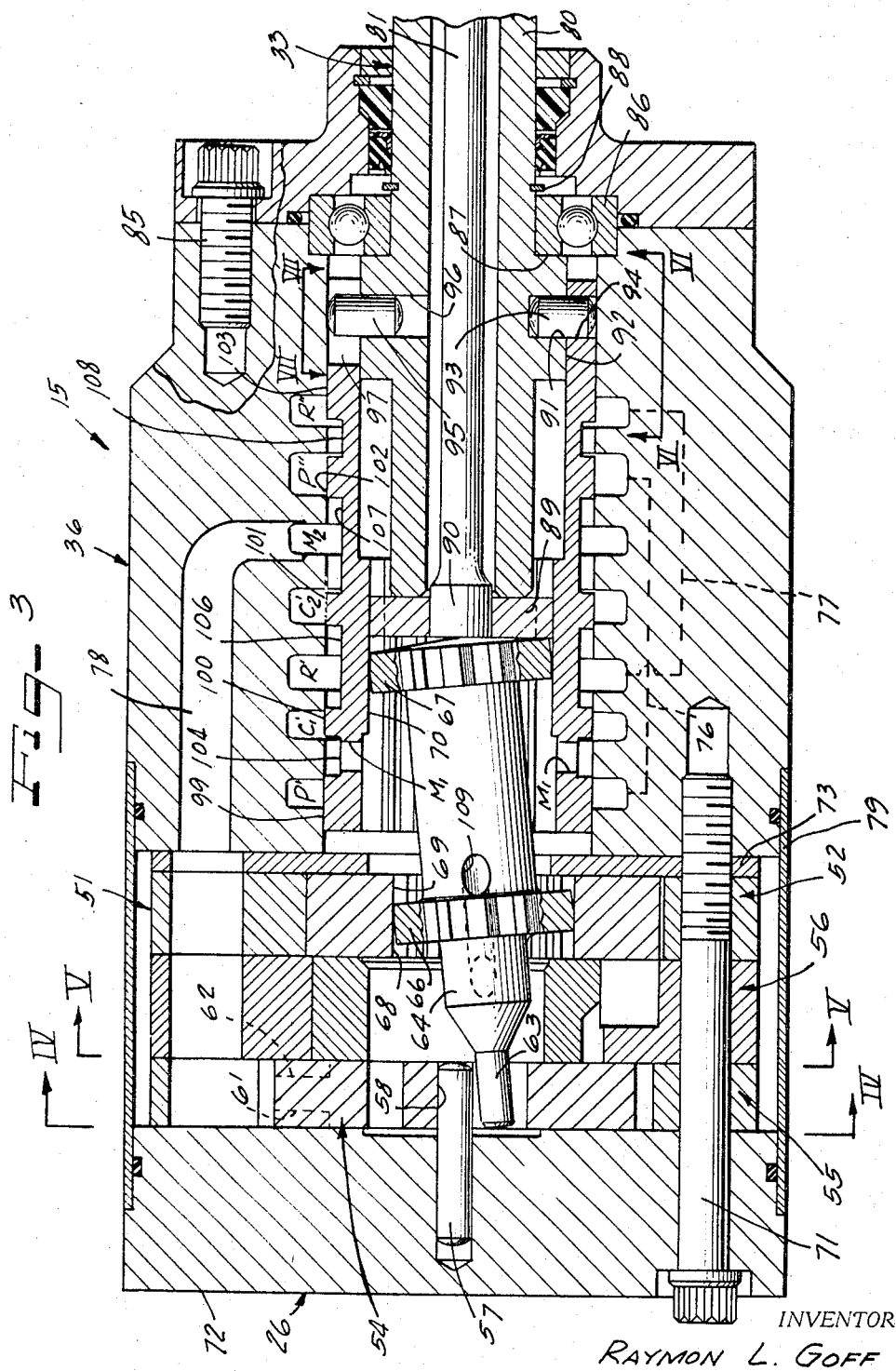

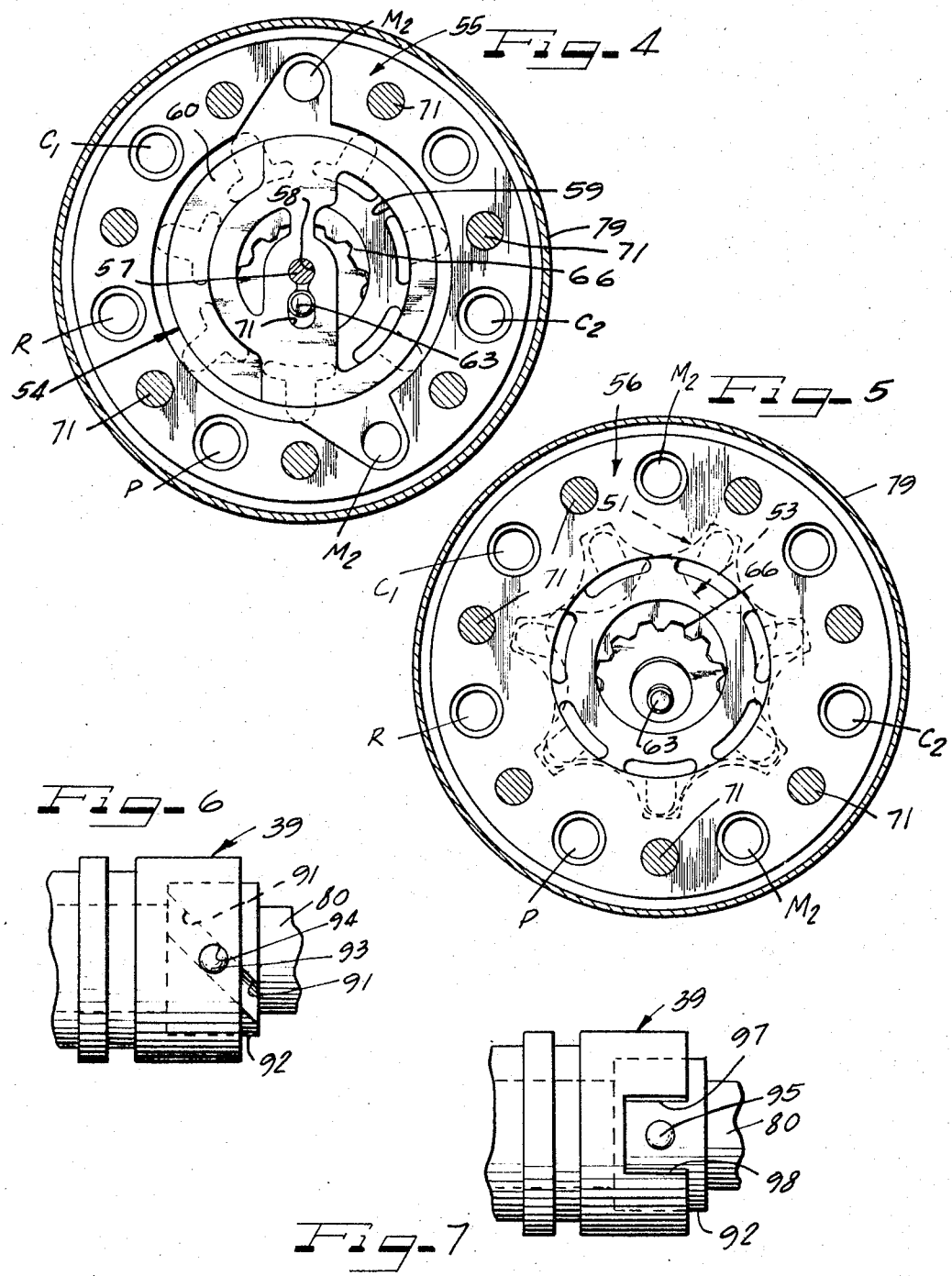

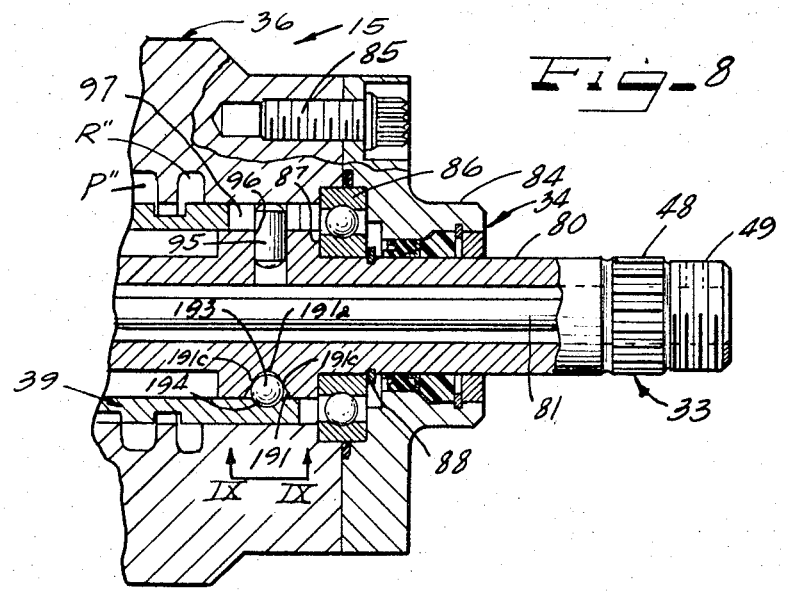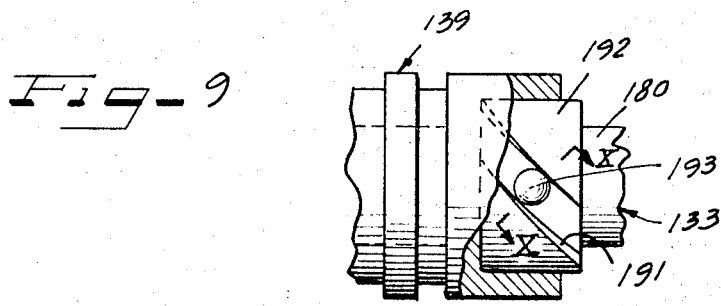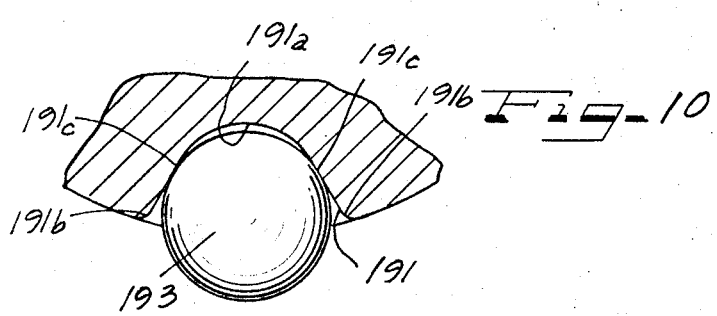

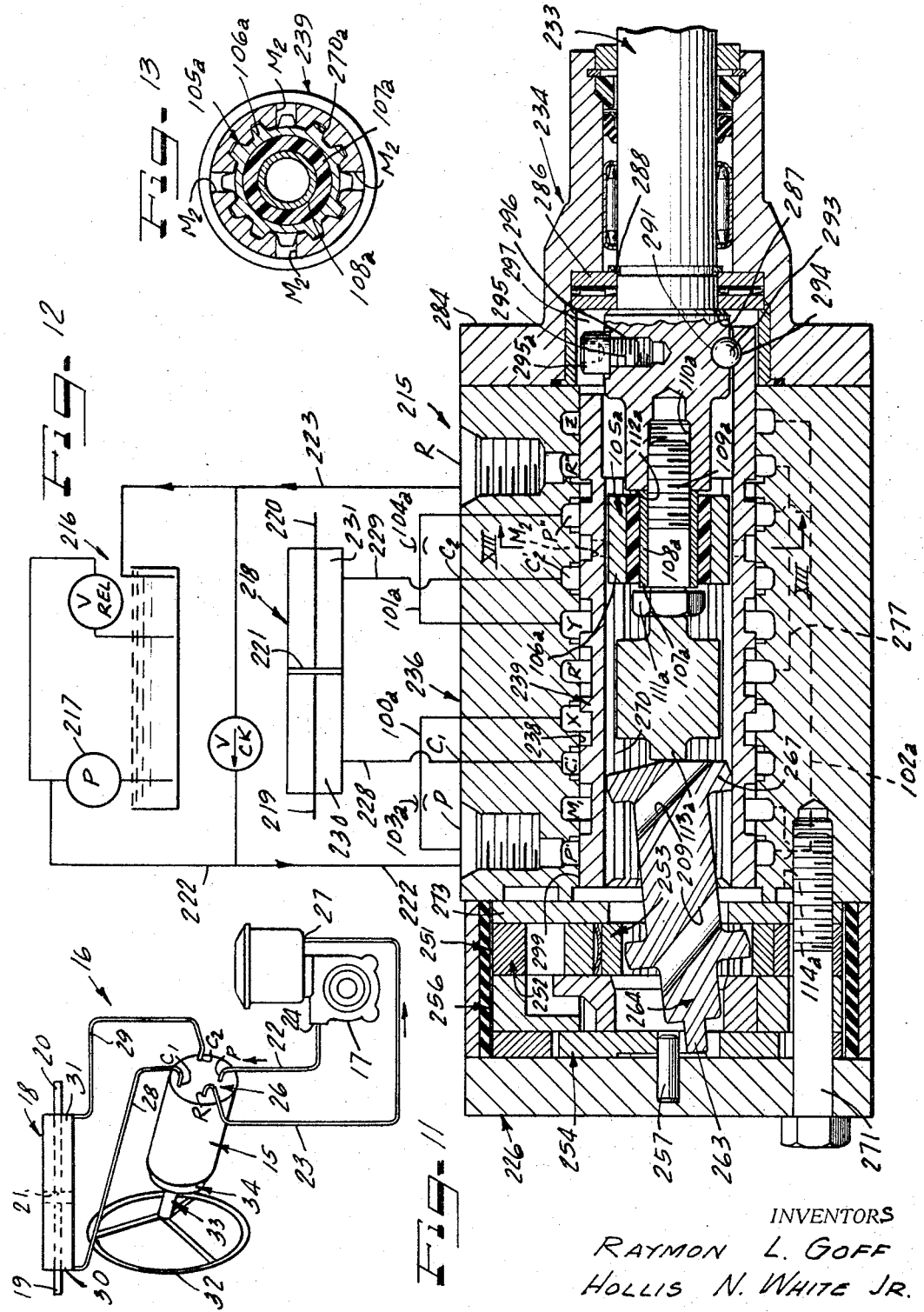

---

3,452,543
HYDROSTATIC DEVICE
Raymon L. Goff, Lafayette, and Hollis N. White, Jr., West Lafayette, Ind., assignors to TRW Inc., Cleveland, Ohio, a corporation of Ohio
Filed Nov. 6, 1967, Ser. No. 680,934
Int. Cl. F15b *13/04, 13/16*
U.S. Cl. 60—52
35 Claims

ABSTRACT OF THE DISCLOSURE

A fluid controller including a housing having a fluid inlet for connection to the discharge side of a main fluid pump, an outlet for connection to the suction side of the main pump and a pair of ports for connection to the opposite sides of a dual acting hydraulic device such as a balanced cylinder of a power steering system for controlling the flow of pressurized fluid to the device. The controller includes a gear set which serves as a fluid meter or as a manual pump, depending upon the operativeness of the main fluid pump, and a spool valve shiftable axially to control the flow through the inlet, the gear set, the cylinder ports and the outlet. A control shaft is mounted for rotation on the housing and is coupled to the spool valve for effecting axial shifting of the spool valve in response to rotation of the control shaft.

Background of the invention

This invention pertains generally to the art of fluid controllers and more particularly to the art of fluid controllers especially adapted for providing hydraulic amplification in power assisting systems such as the power steering systems of dirigible vehicles. The invention also pertains to hydraulic pumps and motors and more particularly to such pumps and motors of the "one-piece" type having hypocycloidal or gerotor gear sets and manually displaceable control valves connected to the gear sets for automatic follow-up displacement in opposition to the manual displacement.

Examples of the prior art are found in Dettlof et al. U.S. Patent No. 3,087,436 and White, Jr., et al. U.S. Patent No. 3,288,034. Both of these patents are expositive of hydraulic assemblies incorporating a gerotor gear set arrangement. In Dettlof et al. 3,087,336 a manual hand-operated pump is adapted for operation by a steering wheel and is separated from a control valve which regulates a continuous flow of fluid delivered by an engine-driven power pump. A steering linkage is power assisted by a balanced cylinder which receives oil from the control valve as metered by the gerotor gear set.

Summary of the invention

In the view of the foregoing the present invention may be summarized as comprising a fluid controller for regulating the flow of pressurized fluid to a hydraulically operated device and including in a single casing a gear set, which can serve both as a manual pump or motor and as a fluid meter, and an axially shiftable spool or sleeve valve for controlling the flow of fluid through the gear set and to the hydraulically operated device. A control shaft is rotatably mounted on the casing in axial alignment with the spool valve and is coupled to the valve so that rotation of the control shaft in opposite directions causes the spool valve to shift axially in opposite directions from a neutral position to axially spaced operating positions.

The coupling between the control shaft and the spool valve comprises a cooperating helical groove and ball arrangement. The coupling further comprises a gear which includes an annularly shaped torsion ring to provide joint rotation between the shaft and the valve but to permit some limited relative rotation therebetween.

An object of the invention is to eliminate lost motion between the control shaft and the spool valve and to that end the helical groove and ball arrangement comprises a single groove which is generally V-shaped in cross-section with a rounded or arcuate bottom portion. A major portion of a single spherical ball is received in the groove and the remaining portion of the ball is seated in a fragmental spherical recess.

It is a further object to reduce fluid leakage along the valve between high and low pressure zones and to this end a series of grooves forming fluid pressure dams are disposed in spaced relation along the valve at particular locations between the various pressure zones to eliminate or reduce fluid leakage therebetween.

Another object is to provide a highly responsive fluid controller in power steering systems to improve the sensitivity and reliability of the systems and to render the steering of dirigible vehicles an easier and more accurate operation.

Many other features, advantages and additional objects of the present invention will become manifest to those versed in the art upon making reference to the detailed description which follows and the accompanying sheets of drawings, in which preferred structural embodiments incorporating the principles of the present invention are shown by way of illustrative example only.

Brief description of the drawings

FIGURE 1 is a perspective view of a fluid controller constructed in accordance with the principles of the present invention with parts shown in section to illustrate their relative disposition;

FIGURE 2 is an elevational view of the end of the fluid controller as viewed from the lefthand side thereof in FIGURE 1;

FIGURE 3 is a cross-sectional view of the fluid controller taken along lines III—III of FIGURE 2;

FIGURE 4 is a sectional view taken along lines IV—IV of FIGURE 3;

FIGURE 5 is a sectional view taken along lines V—V of FIGURE 3;

FIGURE 6 is a view of a helical groove and ball arrangement of the invention taken along lines VI—VI of FIGURE 3 with a casing of the fluid controller removed;

FIGURE 7 is an elevational view of a lost motion connection taken along lines VII—VII of FIGURE 3 with the fluid controller casing removed;

FIGURE 8 is a fragmentary cross-sectional view similar to FIGURE 3 but illustrating another embodiment of the helical groove and ball arrangement;

FIGURE 9 is a view taken along lines IX—IX of FIGURE 8 with the controller casing removed;

FIGURE 10 is an enlarged fragmentary sectional view of the groove and ball arrangement shown in FIGURE 8;

FIGURE 11 is a schematic view of a power steering system for dirigible vehicles which includes a fluid controller constructed according to the present invention;

FIGURE 12 is a partially schematic view of a power steering system which includes another embodiment of a fluid controller constructed in accordance with the principles of the present invention shown in section; and FIGURE 13 is a sectional view taken along lines XIII—XIII of FIGURE 12.

Description of the preferred embodiments

A fluid controller embodying the principles of this invention in indicated generally in FIGURE 11 at reference numeral 15. In that figure the controller 15 comprises one of the components of a hydraulic power assembly indicated generally at 16 which also includes an engine driven main fluid pump 17 and a double acting hydraulic cylinder 18. The hydraulic power assembly 16 may comprise for example a power steering system for a dirigible vehicle wherein the steered wheels of the vehicle are connected to a pair of rods 19 and 20 which extend from the ends of the hydraulic cylinder 18 and which are reciprocated by a piston 21 slidably carried in the cylinder.

Interconnecting the fluid controller 15 and the main pump 17 are a pair of fluid or oil lines 22 and 23. Line 22 is coupled at one end to a discharge or high pressure side 24 of the main pump 17 and at the other end to a main fluid inlet opening indicated at reference character P and formed in an end cap 26 of the fluid controller 15. The other line 23 is coupled at one end to a main fluid outlet opening or return port R formed in the end cap 26 and is connected at its other end to a suction or low pressure side 27 of the pump 17. Another pair of lines 28 and 29 interconnect ends 30 and 31 of the dual-acting cylinder 18 and ports $C_1$ and $C_2$ formed in the end cap 26.

In order to facilitate use of the fluid controller 15 in the power steering system 16 a steering wheel 32 may be mounted fast to a control shaft 33 extending from an end 34 of the controller 15 opposite the end cap 26.

During operation of the assembly 16 the main pump 17 operates continuously to circulate an operating fluid such as oil or the like through line 22 to the fluid controller 15 and back through line 23. Should the steering wheel 32 be turned about its axis the fluid controller 15 directs the high pressure fluid from the discharge side of the main pump 17 to one side of the cylinder 18 and returns the fluid from the other side of the cylinder to the suction side 27 of the pump 17. This, of course, tends to turn the steered wheels of the vehicles. When the steered wheels have turned an amount proportionate to the angle through which the steering wheel 32 has been rotated the fluid controller 15 shuts off additional flow to the cylinder 18 and again circulates the oil directly back to the pump 17. Rotation of the steering wheel 32 in an opposite direction will have the effect of repositioning the fluid controller 15 to direct pressurized fluid to the opposite side of the cylinder 18 and turn the steered wheels in an opposite direction.

The fluid controller 15 includes a valve which regulates the flow of fluid between lines 22, 23, 28 and 29 and a gear set through which the fluid passes between the main pump 17 and the cylinder 18. The valve moves from a neutral position, at which the pressurized fluid from the main pump 17 circulates directly from line 22 back through line 23, to one of two operating positions, at which the fluid from line 22 is directed to line 28 or line 29, in response to rotation of the operating shaft 33. However when the value moves to an operating position the fluid directed through line 28 or line 29 passes through the gear set. The gear set is connected to the valve and serves as a "follow-up" mechanism since operation of the gear set tends to return the value to its neutral position. The fluid controller 15 may be designated a "one-piece" system, as will be understood by those skilled in the art, since the gear mechanism and the valve mechanism are contained within a single casing or housing and since the gear mechanism is mechanically connected to and serves as a follow-up mechanism for the valve after the valve has been moved in response to rotation of the operating shaft 33.

Referring to FIGURES 1–3, the fluid controller 15 may be more particularly characterized as comprising a housing or casing 36 which is generally cylindrically shaped and which has formed therein a cylindrical bore 37 having a bore wall 38. A series of axially spaced circumferential grooves are formed in the bore wall 38 as indicated at reference characters $P'$, $M_1$, $C_2'$, $R'$, $C_1'$, $P''$ and $R''$.

The control valve of the fluid controller 15 which directs the flow of fluid between lines 22, 23, 28 and 29 (FIGURE 11) comprises a tubular sleeve or spool valve indicated at 39. The valve 39 has an outer wall 40 in which are formed a series of axially spaced circumferentially continuous grooves 41–44, and an inner wall 46 which forms an internal chamber 47.

The operating shaft 33, which may be knurled and threaded as at 48 and 49 to facilitate mounting of the steering wheel 32, enters the casing 36 through the end 34 thereof and extends into the chamber 47 in the hollow of the sleeve valve 39.

Disposed between an end 50 of the casing 36 and the end cap 26 is a gear set indicated generally at reference numeral 51 which in the illustrated embodiment comprises a pair of hypocyclodial gears one of which is indicated at reference numeral 52 and the other of which is indicated at 53.

Gear member 52 is internally toothed and gear member 53 is externally toothed and disposed within member 52. Member 52 has one more tooth than does member 53 and as a consequence the gear members are rotatable relative to one another. Because of the configuration and meshing relation of gear members 52 and 53 relative rotation therebetween also causes relative orbital movement. The orbital speed is greater than the relative speed of rotation by a factor equal to the number of teeth of the internally toothed member 52.

During relative orbital and rotational movement of gears 52 and 53 a succession of alternately expanding and contracting fluid chambers are formed between teeth or lobes of the gears. The externally toothed member 53, which in the embodiment illustrated may be referred to as a "star" or rotor, is eccentrically disposed with respect to the internally toothed member 52, which may be referred to as a stator. The overall gear arrangment 51 may be conveniently referred to as a gerotor gear set.

When the sleeve valve 39 is moved from its neutral position to one of its operating positions the pressurized fluid flowing from the main pump 17 to the cylinder 18 flows through the gerotor gear set 51 to operate the gears as a follow-up mechanism with respect to the valve 39. The fluid is directed into and out of the fluid chambers between the teeth of the gear members 52 and 53 by means of a commutator valve indicated generally at reference numeral 54 residing within a valve housing 55. A spacer plate 56 separates the gear set 51 from the commutator valve 54.

Referring to FIGURES 1–5, a pin 57 extends inwardly from the end cap 26 and is received in a bore 58 formed in the commutator valve 54. The valve itself is formed with a cutout 59 on one side thereof and a portion 60 on the other side of the valve is of reduced thickness to provide circumferential recesses 61 and 62.

In the embodiment illustrated the commutator valve 54 is driven for rotation at the orbit speed of the star 53 and is drivingly connected thereto by means of a finger 63 which protrudes from a wobble shaft 64. The wobble shaft 64 is generally cylindrically shaped and comprises axially spaced gear-toothed portions 66 and 67. The toothed portion 66 engages in meshing relation complementarily shaped gear teeth 68 formed in a bore 69 of the star 53, and the toothed portion 67 meshingly engages with gear teeth 70 formed on the inner wall 46 of the sleeve valve 39. The finger 63 is received in a slot 71 formed in the commutator valve 54 in eccentric relation to the center bore 58.

Operation of the gerotor gear set 51 to cause orbital and rotational movement of the star 53 has the effect of rotating the wobble shaft 64 at end portion 67 thereof and both rotating and orbiting the shaft at the toothed portion 66 as well as at the finger 63. The orbiting movement of finger 63 about the stationary pin 57 rotates the commutator valve 54 around the pin 57 at the orbit speed of the star 53. The sleeve valve 39 is rotated by the wobble shaft 64 at the rotational speed of the star 53.

Additional details of the exemplary commutator valve 54, the wobble shaft 64 and the passageways through which the fluid flows through the commutator valve and to and from the gerotor gear set 51 may be found in the aforementioned White, Jr., et al. U.S. Patent No. 3,288,034.

The end cap 26, the commutator valve 54, the valve housing 55, the spacer plate 56 and the gerotor gear set 51 are maintained in assembled relation with the housing 36 by means of a plurality of axially extending assembly bolts 71 which extend through registered bores formed in the aforementioned components. As shown in FIGURE 2 the bolts 71 are angularly spaced about an end wall 72 of the end cap 26.

The ports P, R, $C_1$, and $C_2$ shown in FIGURE 11 are also located in the end cap 26 between the bolts 71. Each of these ports communicates with one of the grooves formed in the bore wall 38 of the housing 36.

For example, in FIGURE 1 the port $C_1$ is shown in the end cap 26. A flow passageway 72 which comprises a series of axially extending registered bores formed in the commutator valve housing 55, the spacer plate 56, the stator or internally toothed gear member 52, a bearing plate 73 and the housing 36, communicates the port $C_1$ with the groove $C_1'$ formed in the bore wall 38. In a similar fashion the port P in the end cap 26 communicates with groove P′ through an axially extending passage 74. Likewise port R communicates with groove R′ and port $C_2$ communicates with groove $C_2'$.

As illustrated in FIGURE 3 the grooves P′ and P″ communicate with each other through a passageway indicated by the dashed lines at reference numeral 76, and the grooves R′ and R″ communicate with each other through passageway 77. The groove $M_2$ communicates with the periphery of the commutator valve 54 through a passageway 78 formed in the housing 36 and extending through registered bores formed in the bearing plate 73, the stator 52 and the spacer plate 56. A tubular member 79 extends between the end cap 26 in the housing 36 to enclose the components disposed therewithin.

The operating shaft 33 includes a hollow shaft 80 and a reduced diameter torsion rod 81 in the hollow of the shaft 80. The outer end of the torsion rod 81 is coupled for joint rotation to the shaft 80 by means of a radial pin 82 which is seated in registered bores formed in the shaft 80 and rod 81.

The operating shaft 33 extends through a bore 83 formed in an end cap 84 and is journalled for rotation on a bearing 86. The shaft 33 is restrained against axial movement by means of a shoulder 87 which abuts one end of the bearing 86, and a lock ring 88 which abuts the other side of the bearing 86.

A gear 89 is formed on an enlarged inner end 90 of the torsion rod 81. As shoown in FIGURES 1 and 3, the gear 89 may abut the gear 67 and both gears are engaged in meshing relation with the internal gear teeth 70 formed on the inner wall 46 of the spool valve 39.

The torsion rod 81 of the operating shaft 33 is capable of twisting about its longitudinal axis much more readily than the hollow rigid shaft 80. As a result a torque applied to the outer end of the shaft 33 will not cause the shaft 80 to rotate unless the hollow shaft 80 is able to rotate. On the other hand, the shaft 80 may rotate in response to a turning torque even though a locking condition of the gear 89 may prevent the inner end 90 of the torsion rod 81 for rotating.

Referring to Figures 1, 3, 6 and 7, the hollow shaft 80 is coupled to the spool valve 39 by means of a helical groove and pin arrangement having the effect of producing axial movement in the sleeve valve 39 in response to relative rotation between the spool valve and the hollow shaft 80. As illustrated, a helical groove 91 is formed in a peripheral wall 92 of the operating shaft 80 and houses a pin 93 which protrudes through a bore 94 extending through the spool valve 39. As the operating shaft 33 and more particularly the hollow shaft 80 is rotated relative to the spool valve 39, the pin 93 rides in the groove 91 and is moved axially, shifting the spool valve 39 along with it. Thus the helical groove and pin arrangement functions in the manner of a cam and cam follower.

The permissible relative rotation between the hollow shaft 80 and the torsion rod 81 is limited by means of another pin 95 seated in a bore 96 of the operating shaft 80 at a point diametrically opposite the pin 93. As shown in Figure 7, the pin 95 protrudes outwardly into a cutout 97 formed in the spool valve 39 comprising a pair of axially extending circumferentially spaced abutment walls 97 and 98. Thus the operating shaft 80 is permitted to rotate relative to the torsion rod 81 only to the extent permitted by the spacing of the abutment walls 97 and 98.

In order to more fully describe the invention the salutary features thereof and the advantageous results derivable therefrom, the operation of the fluid controller 15 will be explained in detail. For convenience, the operation will be described in connection with the function of the fluid controller 15 in the power steering system 16 illustrated in Figure 11, although it should be understood that the controller operates similarly when utilized to control the operation of other pressurized fluid operated devices.

Referring particularly to FIGURES 1 and 3, in the absence of a torque being applied to the operating shaft 33 by the steering wheel 32 or the like, the relative disposition of the operating shaft 33, the spool valve 39 and the grooves formed in the bore wall 38 is as shown in FIGURE 3. Assuming that the main fluid pump 17 (FIGURE 11) is operating, pressurized fluid is directed to the port P in the end cap 26 and through the passageway 74 to the groove P′. Since a land portion 99 of the spool valve 39 blocks the groove P′ the fluid flows through passageway 76 to the second groove P″. Another land portion 102 partially blocks the groove P″ but groove 44 formed in the peripheral wall 40 of the valve 39 is disposed in a straddling position with respect to the groove P″ and the adjacent groove R′ and thus communicates the two grooves. The pressurized fluid then flows from groove R″ through passageway 77 to groove R′, from whence it is conveyed through an appropriate passageway to the port R in the end cap 26, and thence back to the suction side 27 of the pump 17 through the fluid line 23.

This position of the spool valve 39 may be referred to as a neutral position since the fluid merely circulates from the pump 17 through the fluid controller 15 and back to the pump 17 and has no effect on the operation of the gerotor gear set 51 or of cylinder 18.

Assume, however, that a clockwise torque is applied to the operating shaft 33 as viewed in FIGURES 1 and 3. When this occurs the spool valve 39 cannot rotate since it is connected for joint rotation to the star 53 through the wobble shaft 64, and the star 53 cannot rotate since the gerotor gear set 51 is locked hydraulically. The valve 39 is able to move axially, however, and even though the inner end 90 of the torsion rod 81 cannot rotate the operating shaft 80 can and does rotate to shift the spool valve 39 axially leftwardly to an operating position.

As the spool valve 39 moves leftwardly the groove P′ formed in the bore wall 38 communicates with a groove 104 formed in the valve 39. At the other end of the valve 39, a land portion 103 blocks the groove R″ to prevent the pressurized fluid from passing from groove P″ into the groove R″.

Thus the pressurized fluid from the pump 17 is directed through groove P′ and into a series of bores $M_1$ formed in circumferentially spaced relation in the spool valve 39.

The fluid passes through bores $M_1$ into the hollow of the spool valve 39 and through a passageway 109 formed in the wobble stick 64 to the cutout 59 formed in the commutator valve 54. Pressurization of the gerotor gear set 51 causes operation thereof in one direction and the fluid then passes through the passageway 78 into the groove $M_2$ formed in the bore wall 38.

From groove $M_2$ the pressurized fluid passes through groove 107 into groove $C_2'$ and thence, through an appropriate passageway, to the port $C_2$ in the end cap 26. As shown in FIGURE 11, the pressurized fluid passes from the port $C_2$ through oil line 29 to the right hand side 31 of the hydraulic cylinder 18, causing the piston 21 to move leftwardly as viewed in that figure.

The fluid in the left hand side 30 of the cylinder 18 is forced through oil line 28 into port $C_1$ of the fluid controller 15. This low pressure fluid is then directed through an appropriate passageway to groove $C_1'$ in the bore wall 38, and since this groove communicates with the adjacent groove R' through the groove 42 formed in the sleeve valve 39, the fluid is then directed through an appropriate passageway to port R in the end cap 26 and thence through oil line 23 to the suction side of the main fluid pump 17.

It should be noted that the spool valve 39 is able to rotate as soon as it moves axially leftwardly sufficiently to hydraulically unlock the gerotor gear set 51. Upon unlocking of the gear set 51 the torsion built up in the torsion rod 81 tends to rotate the spool valve 39 until it turns to the position which it originally assumed with respect to the hollow shaft 80. In addition, operation of the gerotor gear set 51 and more specifically the rotation of the star 53 rotates the spool valve 39 in the same direction in which the operating shaft 33 was turned, thereby tending to move the spool valve 39 axially rightwardly back to a neutral position with respect to the operating shaft 33 as a result of the helical groove and pin arrangement.

When rotation of the operating shaft 33 has ceased, further rotation of the spool valve 39 by the rotor 53 moves the spool valve 39 back to the neutral position thereof (thus the term "follow-up mechanism") to block the further flow of fluid to the hydraulic cylinder 18 and to hydraulically lock the gerotor gear set 51.

When a counterclockwise torque is applied to the operating shaft 33 the operation of the fluid controller 15 is similar to that described above but in a reverse direction.

For example, when the hollow shaft 80 is turned counterclockwise the spool valve 39 is moved axially rightwardly as viewed in FIGURES 1 and 3. The groove P" is blocked with respect to the groove R" by the land 102, but the groove $M_2$ is then in communication with groove P".

Thus the pressurized fluid from the pump 17 passes from groove P" into groove $M_2$ and thence through passageway 78 to the commutator valve 54 in the gerotor gear set 51. The rotor 53 then rotates and orbits relative to the stator 52 but in a direction opposite to that in which it moves when the spool valve 39 was moved leftwardly.

The fluid emerges from the gerotor gear set 51 and the commutator valve 54 to flow through passageway 109 of the wobble stick 64 and thence through the bores $M_1$ into the groove $C_1'$ and thence to the port $C_1$ in the end cap 26. From the port $C_1$ the fluid flows through line 28 to the lefthand side 30 of the hydraulic cylinder 18 to urge the piston 21 rightwardly.

Of course the fluid on the righthand side 31 of the cylinder 18 flows through line 29 into port $C_2$ and thence to groove $C_2'$ in the fluid controller. Since the groove $C_2'$ is now in communication with the adjacent groove R' through groove 42, the fluid flows from groove R' to the port R in the end cap 26 and thence through oil line 23 to the suction side 27 of the pump 17.

In the operation of the fluid controller 15 as thus far described, the gears 52 and 53 of the gerotor gear set 51 are rotated and orbited relative to one another by the pressure of the fluid being pumped into the main pump 17 to the expanding and contracting chambers formed between the gears 52 and 53. In this respect the gerotor gear set 51 performs the function of metering the quantity of fluid to the hydraulic cylinder 18, since all of the fluid which passes from the pump 17 to the cylinder 18 passes through the gerotor gear set 51, and as noted the gear set 51 also serves as a motor and follow-up mechanism for the spool valve 39, tending to return the spool valve back to the neutral position thereof.

In the event the main pump 17 is inoperative, however, the gerotor gear set 51 serves not as a motor but primarily as a fluid pump.

Assuming, for example, that the main pump 17 is inoperative, a clockwise rotation of the operating shaft 33 will move the spool valve 39 axially leftwardly as viewed in FIGURES 1 and 3, but such movement of the spool valve to an operating position will not effect operation of the gear set 51. Thus the hollow shaft 80 will continue to rotate until the pin 94 (FIGURE 7) abuts the wall 97, thus causing the spool valve 39 to rotate with the hollow shaft 80. Since the spool valve 39 is in an operating position and the gerotor gear set 51 is now hydraulically unlocked, rotation of the valve 39 will turn the wobble shaft 64 to operate the gerotor gear set 51, thereby pumping fluid through the appropriate grooves and ports of the fluid controller 15 to the righthand side of the hydraulic cylinder 18. The fluid in the lefthand side of the cylinder 18 is similarly circulated through the system by the gear set 51.

Of course counterclockwise rotation of the operating shaft 33 will cause the gear set 51 (now operating as a manual pump) to pump fluid in an opposite direction to the lefthand side of the cylinder 18.

It should be noted that when the gear set 51 is being utilized as a manual pump the pump driving connection is from the operating shaft 33 through the spool valve 39 and thence directly to the wobble shaft 64 and the star 53.

Another embodiment of the helical groove and ball coupling arrangement between the operating shaft and the spool valve is illustrated in FIGURES 8–10, wherein reference numerals previously used in FIGURES 1–7 are used again to illustrate similar parts but increased by the number "100."

In the embodiment shown in FIGURES 8–10 the groove 191 which is formed in the peripheral wall 192 of the hollow shaft 180 is generally V-shaped but has an arcuate bottom wall 191a and arcuate end portions 191b.

A spherical ball 194 is substituted for the pin 94 of the previously described embodiment and it is noted that the depth of the groove 91 is such that a major portion of the ball 194 is housed in the groove 191. The bottom wall 191 is fragmentally circularly shaped and has a radius in cross-section which is less than the radius of the ball 194 such that the surface of the ball does not engage the bottom wall 191a but instead engages the walls of groove 191 at substantially oppositely disposed portions 191c.

The minor portion of the ball 194 which is not housed in the groove 191 is seated in a fragmentally spherically shaped recess 194 formed in the spool valve 139. The radius of recess 194 is substantially identical to that of the sphere 193 and thus provides a snug bearing surface for the ball 193.

The coupling arrangement disclosed in FIGURES 8–10 substantially eliminates lashing and lost motion between the hollow shaft 180 and the spool valve 139 and also reduces the frictional force losses of the coupling. A substitution of the embodiment of the coupling arrangement shown in FIGURES 8–10 for that disclosed in FIGURES 1–7 of course in no wise effects the other aspects of the operation of the fluid controller 15.

Another embodiment of the invention is disclosed in FIGURES 12–13. Once again parts similar to those disclosed in FIGURES 1–7 are designated with similar reference numerals raised by the number "200."

In this embodiment the bore wall 238 is formed with additional grooves designated by reference characters X, Y and Z. These grooves may be referred to as "pressure dams" since they are subjected to high static pressure and are disposed between adjacent active or flow through grooves, the pressure of one being substantially less than the pressure of the other.

For example, groove X is connected to the fluid inlet port P of the fluid controller 215 by means of a conduit indicated diagrammatically at reference numeral 100a and groove Y is connected to groove P″ through passageway 101a. The groove P′ is connected to groove P″ as well as groove Z by means of a conduit 102a. Thus all of the grooves P′, P″, X, Y and Z are in communication with the fluid in the port P. It is also noted that restrictive orifices or other flow impeding means 103a and 104a are connected into the lines 100a and 101a to restrict the flow rate between the fluid in the port P and the pressure dams X and Y.

The fluid controller 215 also differs from the embodiment disclosed in FIGURES 1–7 in the torsional or centering coupling between the operating shaft 233 and the spool valve 239.

To explain more fully, the spool valve 239 is moved axially in response to rotation of the shaft 233 relative thereto by means of a helical groove and ball arrangement wherein the spherical ball is indicated at 293, a recess 294 in the valve 239 receiving the minor portion of the ball 293 and a groove 291 in the shaft 233 for receiving the major portion of the ball 293. In addition the head 294a of a threaded pin 294 projects into a slot 295 formed in the valve 239 for joint rotation of the operating shaft 233 and the spool valve 239 after the shaft 233 has rotated through a predetermined angle relative to the valve 239 determined by the circumferential width of the slot 295.

Unlike the previously described embodiment, however, the centering of the spool valve 239 with respect to the shaft 233 (that is, return of the spool valve 239 to its neutral position in the absence of a turning force on the shaft 233 during manual steering) is accomplished by a torsion member different from the torsion bar 81 of the last described embodiment. In the embodiment shown in FIGURES 12 and 13 a gear 105a which resides in the bore of the valve 239 engages in meshing relation the gear teeth formed on the inner wall 270 of the valve 239. The gear 105a comprises an outer annular member 106a on which the gear teeth are formed, resilient annular member 107a and a bushing 108a. The three members 106a–108a may be bonded together or otherwise connected in fixed assembly to form the unitary torsion member 105a.

The axial extent of the bushing 108a is slightly greater than that of the resilient member 107a and the gear member 106a. A threaded stud such as a bolt or the like fastener indicated at 109a extends through the bore of the bushing 108a and is seated in a complementarily threaded bore 110a of the operating shaft 233. The bolt 109a is threaded into the bore 110a until a head portion 111a clamps the bushing snuggly between the head portion and an end wall 112a of the operating shaft 233.

The resilient member 107a may be constituted of an elastomeric material or the like to enable the outer member 106a to rotate to a limited extent relative to the bushing 108a and to the operating shaft 233. In this respect the torsion member 105a functions in a manner similar to the torsion rod 81 of the embodiment shown in FIGURES 1–7.

The advantages inherent in the utilization of the gear 105a as the torsion coupling become readily apparent when it is considered that no-lash condition during manual steering is accomplished only by accurate return of the sleeve valve 239 back to the neutral position theerof when rotation of the operating shaft 233 ceases.

In the embodiment shown in FIGURES 1–7 it is necessary to the proper functioning of the fluid controller 15 that the machining and the assembly of the hollow shaft 80 and the torsion rod 81 is sufficiently close in tolerance such that when the operating shaft 33 is mounted in the housing 36 and the teeth of the gear member 89 mesh with the internal teeth of the spool valve 39, the spool valve will reside in its centered or neutral position absent a torque being applied to the operating shaft 33. Any misalignment between the hollow shaft 80 and the torsion rod 81 and the intermeshing gear teeth will produce a displacement of the spool valve 39 from the neutral position thereof. In addition, any variation in the resistance to twisting of the rod 81 necessitates the substitution of another rod to ensure proper centering of the spool valve.

In the embodiment illustrated in FIGURES 12 and 13, however, the gear member 105 may be easily adjusted to ensure the proper centering of the spool valve 239. That is, the bolt 109a can be loosened and the gear member 105a rotated relative to the shaft 233 until proper alignment thereof is attained, whereupon the bolt can be merely tightened to securely clamp the gear member 105a on the shaft 233.

A spacer block 113a is mounted in the bore of the valve 239 between the wobble shaft 264 and the bolt 109a to maintain proper spacing of the parts. The block 113a is relatively rotatable with respect to both the wobble shaft 264 and the bolt 109a.

In operation of the fluid controller 215 within the power steering system 216 and with the main fluid pump 217 operating, clockwise rotation of the operating shaft 233 is effective to move the spool valve 239 axially leftwardly as viewed in FIGURE 12. The high pressure groove P′ then communicates with groove $M_1$ to supply pressurized fluid to the commutator valve 254 through passage 114a. Since the gerotor gear set 251 is now hydraulically unlocked, the star 253 rotates and orbits relative to the stator 252 and the fluid is discharged therefrom into and through passages 209 in the wobble shaft 264. The fluid then travels around the spacer block 113 in the bore of the spool valve 239 and partially past the gear 105a to the bores $M_2$ formed in the valve 239. These bores communicate with grooves $C_2'$ to supply the pressurized fluid through oil line 229 to one side 231 of the hydraulic cylinder 218.

The oil in the other side 230 passes through line 228 through the groove $C_1'$, which in the leftward operating position of the valve 239 communicates with the pressure dam groove X and the return groove R′. The fluid then flows through passageway 277 to groove R″, and from thence to the fluid outlet R through line 223 back to the pump 217.

In this leftward operating position of the valve 239, the groove $C_2'$ is at a much higher pressure than is groove R′. The pressure dam Y, however, is subjected to the higher pressure to prevent excessive leakage from groove $C_2'$ to groove R′. It is noted that slight leakage between the pressure dam groove Y and the return groove R′ will not discernably effect the operation of the fluid controller 215 or the steering effects of the system 216, whereas leakage between groove $C_2'$ and R′ would result in a more loosely controlled steering system.

On the other hand, the pressure dam groove X is in direct communication between the low pressure cylinder port groove $C_1'$ and the return groove R′. Excessive leakage from the pressure dam groove X to groove R′ is prevented, however, by means of the restrictive orifice 103a in the line 100a between the fluid inlet P and the pressure dam groove X.

Rotation of the operating shaft 233 in a counterclockwise direction, of course, has the effect of moving the spool valve 239 in a rightward direction as viewed in FIGURE 12. In such circumstances the lefthand side 230 of the cylinder 213 is supplied with the high pressure fluid and the steered wheels are caused to turn in an opposite direction. The pressure dam groove X then serves as a buffer between groove $C_1'$ and $R'$, whereas groove Y merely serves as a conduit between grooves $R'$ and $C_2'$. Once again substantial leakage through the pressure dam groove Y is prevented due to the restrictive orifice 104a in the line 101a.

In order to enable the fluid to pass freely between the bores $M_2$ in the valve 239 and the bore of the valve, the gear member 106a is constructed with several gear teeth omitted.

Referring to FIGURE 13, for example, it is noted that gear teeth on the gear 105a are omitted at those points around the circumference thereof which register with the passages $M_2$ in order to enable the fluid to pass easily axially past the gear member 105a.

Although minor modifications might be suggested by those versed in the art, it should be understood that we wish to embody within the scope of the patent warranted hereon all such modifications as reasonably come within the scope of our contribution to the art.

We claim as our invention:

1. A fluid controller for controlling the operation of a pressurized operated device comprising:
   a controller housing having an inlet for connection to a source of pressurized fluid, an outlet for return of the fluid to the source and a pair of fluid ports for communicating with a pair of cooperating ports in the fluid operated device,
   a gerotor gear set in said housing including an internally toothed gear and a cooperating externally tooth gear within said internally toothed gear,
      one of said gears being arranged rotational movement with respect to the other gear for providing relative rotational and orbital movement therebetween and for providing between the gears a succession of alternately expanding and contracting fluid chambers,
   fluid directing means comprising passageway means and valve means communicating said inlet, said outlet, said ports and said fluid chambers and including,
   a sleeve valve movable axially in opposite directions from a neutral position, for blocking communication between said inlet and said gear set, to first and second operating positions for directing the pressurized fluid from said inlet through said gear set to one of said ports and from the other of said ports to said outlet,
      the direction of relative rotation of said gears and the direction of the flow of fluid therethrough alternating as said sleeve valve is moved between said first and second operating positions,
   a control shaft mounted for rotation on said housing,
   means interconnecting said control shaft and said sleeve valve for shifting said sleeve valve axially from the neutral position to said operating positions as the control shaft is rotated relative to said sleeve valve in opposite directions of rotation, and
   a wobble shaft rotatably interconnecting said sleeve valve and said rotatable gear for providing follow-up rotational movements to said sleeve valve relative to said control shaft to tend to return said sleeve valve to the neutral position thereof,
      said wobble shaft having an axis of rotation intersecting the axis of said sleeve valve.

2. The fluid controller as defined in claim 1 and including means forming a cylindrical bore in said housing,
   said sleeve valve disposed in said bore in axial alignment therewith and in axial alignment with said control shaft.

3. The fluid controller as defined in claim 1 wherein said fluid directing means comprises:
   a rotatable commutator valve in said housing associated with said gear set, and including,
   means for rotating said commutator valve at the orbit speed of said movable gear,
   said sleeve valve being rotated at the rotational speed of said movable gear.

4. A fluid controller for a hydrostatic device comprising:
   a housing having a cylindrical bore formed therein and an inlet, an outlet and a pair of ports communicating with said bore,
   a gerotor gear set in said housing including a pair of gears relatively movable orbitally and rotationally at orbit and at rotational speeds to provide expanding and contracting fluid chambers therebetween and a rotatable commutator valve means associated with said gear set and disposed externally of said bore,
   a sleeve valve in said bore shiftable axially alternatively from a neutral position for blocking said gear set from said inlet to first and second axially spaced operating positions for directing fluid in opposite directions from said inlet through said commutator valve, said gear set and said ports to said outlet,
   means connecting said commutator valve and said gear set for rotating said commutator valve at the orbit speed of said gear set,
   a control shaft mounted for rotation in said housing,
   coupling means interconnecting said control shaft and said sleeve valve for shifting said sleeve valve axially from said neutral position and between said first and second operating positions in response to relative rotation between said control shaft and said sleeve valve, and
   means connecting said gear set and said sleeve valve for rotating said sleeve valve at the speed of rotation of said gear set and in the direction of rotation of said control shaft to provide follow-up axial shifting of said sleeve valve toward the neutral position thereof.

5. The fluid controller as defined in claim 4 wherein said connecting means comprise:
   a rotatable wobble shaft having an axis intersecting the axis of the sleeve valve,
   gear teeth formed on a rotational and orbital one of said gears and on said sleeve valve, and
   axially spaced gear teeth formed on said wobble shaft meshing with the gear teeth on said one gear and on said sleeve valve for joint rotation thereof.

6. The fluid controller as defined in claim 5 wherein said coupling means comprises:
   a first means coupling said sleeve valve to said control shaft for moving said sleeve valve axially with respect to said control shaft in response to relative rotation therebetween, and
   second means coupling said sleeve valve to said control shaft for limited rotation independently of said control shaft and for common rotation therewith.

7. The fluid controller as defined in claim 6 wherein said first coupling means comprises cooperating cam and cam follower means on said control shaft and on said sleeve valve.

8. The fluid controller as defined in claim 6 wherein said second coupling means comprises an elongated torsion shaft.

9. The fluid controller as defined in claim 6 wherein said second coupling means comprises a gear member including an elastomeric annularly shaped ring.

10. A fluid controller for controlling the flow of fluid to a pressurized fluid operated device comprising:
   a housing having a first bore therein and an inlet,
   an outlet and a pair of ports communicating with said first bore,
   a second bore formed in said housing,
   a pair of gerotor gears in said second bore arranged in meshing relation for relative orbital and rotational movement to provide a succession of alternately expanding and contracting fluid chambers therebetween upon relative rotation thereof,
   means for communicating said chambers and said first bore including a commutator valve in said second bore and a control valve shiftable axially in said first bore from a neutral position for blocking said chambers from said inlet to first and second axially spaced operating positions for directing fluid from said inlet through said valves and said fluid chambers to one of said ports and from the other of said ports to said outlet to turn said gears relatively in one direction and alternatively for directing fluid from said inlet through said valves and said fluid chambers to the other of said ports and from said one port to said outlet to turn said gears relatively in an opposite direction, a control shaft rotatably carried in said housing, coupling means connecting said control shaft and said control valve for relative axial movement of said control valve between said first and second positions in response to relative rotation of said control shaft in opposite directions and for limited relative rotation and for joint rotation of said control shaft and said control valve, and means connecting a rotating one of said gerotor gears and said control valve for joint rotation in the direction of rotation of said control shaft to effect follow-up movements to said control valve relative to said control shaft tending to return said valve to said neutral position.

11. The fluid controller as defined in claim 10 wherein said control shaft and said control valve are in axial alignment and have overlapping cylindrically shaped mating faces and wherein said coupling means comprises:
  a helical groove formed in one of said faces and a sphere-shaped ball protruding from the other face and received in said groove,
    said groove being generally V-shaped in axial cross-section with a rounded bottom spaced slightly from the surface of said ball and rounded edges joining said one of said faces.

12. The fluid controller as defined in claim 11 and including:
  a fragmental spherical recess formed in the other face for receiving said ball.

13. The fluid controller as defined in claim 12 wherein said groove and said recess are sized so that a greater portion of said ball is received in said groove than in said recess.

14. The fluid controller as defined in claim 10 wherein said coupling means comprises:
  means forming gear teeth on said control valve, and
  a coupling gear carried on said control shaft and meshing with the teeth of said control valve,
    said coupling gear comprising an elastomeric member to permit limited relative rotation therebetween.

15. The fluid controller as defined in claim 14 and including:
  means mounting said coupling gear on said control shaft in axial alignment with said control valve and said control shaft for selective angular adjustment therebetween to adjust the neutral position of the control valve axially relative to the control shaft.

16. The fluid controller as defined in claim 15 wherein said coupling gear mounting means comprises:
  an axially extending bore formed in the end of said control shaft and a threaded stud passing through said coupling gear and threaded into the bore.

17. In apparatus including an axially shiftable and rotatable fluid valve and an axially aligned and rotatable control shaft for axially shifting and for rotating the fluid valve, the improvement of means for coupling the fluid valve to said control shaft for relative axial movement in response to relative rotation therebetween and for limited relative rotation and for joint rotation of said fluid valve and said control shaft comprising:
  mating faces formed on said valve and on said control shaft for relative axial and rotational movement, cooperating helical groove and ball means in said faces.
  gear means between said valve and said control shaft for joint rotation thereof, and
  elastomeric means in said gear means for providing limited relative rotation between said valve and said control shaft.

18. The apparatus as defined in claim 17 and including:
  means for selectively adjustably aligning said gear means relative to said control shaft.

19. Apparatus as defined in claim 17 wherein said control shaft comprises a radial end wall and including gear teeth formed on said valve, said gear means comprising:
  a gear axially aligned with said valve and said control shaft and abutting the radial end wall of said control shaft,
    said gear comprising a cylindrical bushing having a smooth internal surface,
  a threaded stud extending through said bushing for relative rotation therewith,
  a threaded bore formed in the end wall of said control shaft for receiving said stud, and
  a head portion formed on said stud for tightening against the bushing to clamp the bushing against said end wall for joint rotation of said gear with said control shaft.

20. A fluid controller including in combination:
  a housing having a bore therein,
  inlet means and outlet means in said housing providing for the introduction and exit of fluid, valve means in said bore,
  a pair of spaced cylinder ports in said housing communicating with said bore,
  a pair of spaced return ports in said housing communicating with said bore,
    said valve means adapted to appropriately direct fluid flow from said inlet means to said cylinder and return ports and to said outlet means,
    one of said return ports being disposed between said cylinder ports and the other of said return ports being disposed outside of said cylinder ports,
  means forming a pair of high pressure grooves between said cylinder ports and at least one high pressure groove outside of said cylinder ports, and means for feeding said high pressure grooves with high pressure fluid from the inlet of said controller to reduce the leakage from said cylinder ports to said return ports.

21. The fluid controller as defined in claim 20 wherein said high pressure groove outside of said cylinder ports is on the same side of the cylinder ports as is said outside return port and is outside of said outside return port with respect to said cylinder ports.

22. The fluid controller as defined in claim 20 wherein said feeding means comprises fluid passage means having flow restriction means therein for reducing flow to at least one of said high pressure grooves.

23. The fluid controller as defined in claim 22 wherein said restriction means reduces the flow to both of said high pressure grooves between said cylinder ports.

24. A fluid controller for a pressurized fluid operated device comprising:
  a housing having a pair of gerotor gears therein,
    said gears being internally and externally toothed respectively and one of said gears being rotatable relative to the other to provide relative rotational and orbital movement and a succession of expanding and contracting chambers therebetween,
  means forming a bore in said housing,
  valve structure in said housing including an inlet for connection to a source of pressurized fluid, an outlet for return of fluid to the source,
  a pair of ports for connection to the pressurized fluid operated device and fluid passages communicating said bore with said chambers, said valve structure further comprising a commutator valve outside of said bore and adjacent said pair of gears and a rotatable control valve member in said bore shiftable axially in opposite directions from a neutral position to a pair of axially spaced operating positions, means for connecting said valve member to said rotatable gear for joint rotation thereof, said valve structure being constructed and arranged so that axial movement of said control valve member between said operating positions causes pressurized fluid to flow from said inlet to said outlet in opposite directions through said chambers and said ports to cause said rotatable gear to rotate in opposite directions, said control valve member in the neutral position thereof blocking flow of fluid from said inlet to said chambers, a control shaft carried in said housing for rotation relative to said housing and to said control valve member, and means coupling said control shaft to said control valve member for shifting said control valve member axially from the neutral to the operating positions thereof upon rotation of said control shaft in opposite directions, the rotation of said rotatable gear in response to the shifting of the control valve member to an operating position causing rotation of said control valve member in a direction tending to shift said control valve member axially back to the neutral position thereof.

25. The fluid controller as defined in claim 24 wherein said coupling means comprises:

means providing for joint rotation and limited independent rotation of said control shaft and said control valve member.

26. The fluid controller as defined in claim 24 wherein said coupling means comprises:

biasing means tending to rotate said control valve member relative to said control shaft for shifting the control valve member axially to the neutral position thereof.

27. The fluid controller as defined in claim 24 wherein said connecting means between said control valve member and said rotatable gear prevents relative rotation therebetween.

28. A fluid controller including in combination a housing:

a bore wall in said housing forming a cylindrical bore, an axially shiftable sleeve valve in said bore having a tubular wall in snug sliding engagement with said bore wall, means in at least one of said walls forming a plurality of axially spaced circumferential grooves including, in order along the axes of the walls, a first fluid inlet groove,
a first meter groove,
a first cylinder port groove,
a first switching pressure dam groove,
a first fluid return groove,
a second switching pressure dam groove,
a second cylinder port groove,
a second meter groove,
a second fluid inlet groove,
a second fluid return groove, and
a static pressure dam groove, additional circumferential grooves formed in at least one of said walls for directing fluid in a predetermined manner between said first named grooves in response to axial shifting of said valve, first passage means communicating said fluid inlet grooves and said switching pressure dam grooves, and second passage means communicating said fluid inlet grooves and said static pressure dam groove.

29. The fluid controller as defined in claim 28 and including:

restriction means in said first passage means for substantially limiting fluid flow therethrough.

30. The fluid controller as defined in claim 28 and including:

a control shaft rotatably carried in said housing, and means coupling said control shaft to said sleeve valve for shifting said sleeve valve axially between first and second positions in response to rotation of said control shaft in opposite directions for communicating said fluid inlet grooves with one of said cylinder port grooves and the other of said cylinder port grooves with said fluid return grooves in said first position of said sleeve valve and for communicating said fluid inlet grooves with the other of said cylinder port grooves and said one of said cylinder port grooves with said fluid return grooves in said second position of said sleeve valve.

31. Thte fluid controller as defined in claim 30 wherein each of said switching pressure dam grooves is in communication with its axially adjacent cylinder port groove and said first fluid return groove when said sleeve valve is in one of said two positions and serves as a buffering chamber between its axially adjacent cylinder port groove and said first fluid return groove when said sleeve valve is in the other of said two positions.

32. The fluid controller as defined in claim 30 wherein said static pressure dam groove serves as a static buffering chamber in both of said two positions of said sleeve valve.

33. A fluid controller for fluid under pressure in power steering installations and the like which comprises:

a housing, a shaft rotatably carried by said housing, a pressure fluid flow control valve slidable in said housing, means translating rotation of the shaft into axial shifting of the valve in said housing, means connecting the valve and shaft for corotation, a gerotor gear set assembly in said housing including relatively rotating and orbiting gears providing therebetween alternately expanding and contracting fluid chambers and a commutator valve separate from said control valve for controlling fluid flow between said control valve and said chambers, and means rotatably coupling one of said gears with said control valve and said separate commutator valve whereby said shaft may drive said one gear through said control valve upon failure of the pressure fluid to develop fluid flow and slide said control valve axially to control the flow of pressure fluid or fluid flow developed by said gears through said controller.

34. A fluid controller for use as a meter and as a pump in the power and manual operation, respectively, of a dual-acting pressurized-fluid operated hydraulic device comprising:

a housing having a plurality of openings including a fluid inlet for connection to the discharge side of a main fluid pump, a fluid outlet for connection to the suction side of the main fluid pump and a pair of ports for connection respectively to the opposite sides of the dual-acting hydraulic device, meter-pump means in said housing comprising a gerotor gear assembly including a rotatable gear and a commutator valve, means forming a bore in said housing communicating with said openings and said gear assembly, a single rotatable control valve in said bore shiftable axially in opposite directions for changing the direction of flow of fluid through said gerotor gear assembly and to and from said ports, means interconnecting said rotatable gear and said control valve for joint rotation, a control shaft journalled for rotation on said housing in axial alignment with said control valve, and means interconnecting said control shaft and said control valve for shifting said control valve axially in said bore upon rotation of said control shaft relative to said control valve through a given angle and for joint rotation of said control shaft and said control valve after said control shaft has been rotated through said given angle for driving said rotatable gear by said control shaft through said control valve under manual operation of said hydraulic device.

35. A fluid controller for use as a meter and as a pump in the power and manual operation, respectively, of a dual-acting pressurized-fluid operated hydraulic device comprising:

a housing having a plurality of openings including a fluid inlet for connection to the discharge side of a main fluid pump, a fluid outlet for connection to the suction side of the main fluid pump and a pair of ports for connection respectively to the opposite sides of the dual-acting hydraulic device, meter-pump means in said housing comprising a gerotor gear assembly including a rotatable gear and a commutator valve, means forming a bore in said housing communicating with said opening and said gear assembly, a single rotatable control valve in said bore shiftable axially in opposite directions for changing the direction of flow of fluid through said gerotor gear assembly and to and from said ports, means interconnecting said rotatable gear and said control valve for joint rotation, a control shaft journalled for rotation on said housing in axial alignment with said control valve, and means interconnecting said control shaft and said control valve for shifting said control valve axially in said bore upon rotation of said control shaft relative to said control valve through a given angle and for joint rotation of said control shaft and said control valve after said control shaft has been rotated through said given angle for driving said rotatable gear by said control shaft through said control valve under normal operation of said hydraulic device, said interconnecting means comprising a gear member including an elastomeric ring for limited relative rotation and for joint rotation of said control shaft and said control valve.

References Cited

UNITED STATES PATENTS

| | | | |
|---|---|---|---|
| 2,959,978 | 11/1960 | Boutwell | 74—89.15 XR |
| 3,099,188 | 7/1963 | Folkerts | 91—374 |
| 3,246,472 | 4/1966 | Kries | 60—52 |
| 3,288,034 | 11/1966 | White et al. | 91—56 |
| 3,385,057 | 5/1968 | Pruvot et al. | 60—52 |

EDGAR W. GEOGHEGAN, *Primary Examiner.*

U.S. Cl. X.R.

91—56, 378; 180—792